United States Patent
Kittichokechai et al.

(10) Patent No.: US 12,408,147 B2
(45) Date of Patent: Sep. 2, 2025

(54) CONFIGURATION OF DOWNLINK CONTROL INFORMATION FORMATS

(71) Applicant: Telefonaktiebolaget LM Ericsson (PUBL), Stockholm (SE)

(72) Inventors: Kittipong Kittichokechai, Järfälla (SE); Yufei Blankenship, Kildeer, IL (US); Mattias Andersson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 488 days.

(21) Appl. No.: 17/774,519

(22) PCT Filed: Nov. 3, 2020

(86) PCT No.: PCT/IB2020/060313
§ 371 (c)(1),
(2) Date: May 5, 2022

(87) PCT Pub. No.: WO2021/090168
PCT Pub. Date: May 14, 2021

(65) Prior Publication Data
US 2022/0377706 A1     Nov. 24, 2022

Related U.S. Application Data

(60) Provisional application No. 62/933,265, filed on Nov. 8, 2019.

(51) Int. Cl.
*H04W 72/02* (2009.01)
*H04L 1/00* (2006.01)
(Continued)

(52) U.S. Cl.
CPC ............ *H04W 72/02* (2013.01); *H04L 1/0003* (2013.01); *H04L 5/0051* (2013.01); *H04W 72/23* (2023.01)

(58) Field of Classification Search
CPC .... H04W 72/02; H04W 72/23; H04L 1/0003; H04L 5/0051; H04L 5/0044; H04L 5/0053; H04L 5/0094
See application file for complete search history.

(56) References Cited

U.S. PATENT DOCUMENTS

2012/0281604 A1   11/2012  Papasakellariou et al.
2017/0264402 A1   9/2017   Papasakellariou
(Continued)

FOREIGN PATENT DOCUMENTS

EP   4090106 A1 *  11/2022  ............. H04L 5/001

OTHER PUBLICATIONS

PCT International Search Report issued for International application No. PCT/IB2020/060313—Feb. 2, 2021.
(Continued)

*Primary Examiner* — Chae S Lee
(74) *Attorney, Agent, or Firm* — Baker Botts L.L.P.

(57) ABSTRACT

A method by a wireless device includes determining a value of a Sounding Reference Signal (SRS) request field size. The wireless device receives downlink control information (DCI) from a network node. The DCI is received according to a format. The wireless device selects a SRS resource set based on the format of the DCI and the value of the SRS request field size.

19 Claims, 13 Drawing Sheets

(51) Int. Cl.
*H04L 5/00* (2006.01)
*H04W 72/23* (2023.01)

(56) References Cited

U.S. PATENT DOCUMENTS

| | | | |
|---|---|---|---|
| 2019/0273637 A1 | 9/2019 | Zhang et al. | |
| 2019/0349964 A1* | 11/2019 | Liou | H04B 7/0626 |
| 2020/0127777 A1* | 4/2020 | Papasakellariou | H04W 52/58 |
| 2021/0105753 A1* | 4/2021 | Zhang | H04L 5/0048 |
| 2022/0116178 A1* | 4/2022 | Go | H04L 1/0013 |
| 2022/0191839 A1* | 6/2022 | Ying | H04W 72/23 |
| 2022/0361223 A1* | 11/2022 | Li | H04L 1/1822 |
| 2023/0269043 A1* | 8/2023 | Matsumura | H04L 5/0053 370/329 |
| 2024/0014972 A1* | 1/2024 | Matsumura | H04W 72/232 |

OTHER PUBLICATIONS

PCT Written Opinion of the International Searching Authority issued for International application No. PCT/SE2020/060313—Feb. 2, 2021.
3GPP TS 38.331 V15.7.0 (Sep. 2019); 3rd Generation Partnership Project; Technical Specification Group Radio Access Network; NR; Radio Resource Control (RRC) protocol specification (Release 15).
3GPP TS 38.214 V15.7.0 (Sep. 2019); 3rd Generation Partnership Project; Technical Specification Group Radio Access Network; NR; Physical layer procedures for data (Release 15).
3GPP TS 38.212 V15.7.0 (Sep. 2019); 3rd Generation Partnership Project; Technical Specification Group Radio Access Network; NR; Multiplexing and channel coding (Release 15).

* cited by examiner

CONFIGURATION OF DOWNLINK CONTROL INFORMATION FORMATS

PRIORITY

This nonprovisional application is a U.S. National Stage Filing under 35 U.S.C. § 371 of International Patent Application Serial No. PCT/IB2020/060313 filed Nov. 3, 2020 and entitled "CONFIGURATION OF DOWNLINK CONTROL INFORMATION FORMATS" which claims priority to U.S. Provisional Patent Application No. 62/933,265 filed Nov. 8, 2019 both of which are hereby incorporated by reference in their entirety.

TECHNICAL FIELD

The present disclosure relates, in general, to wireless communications and, more particularly, systems and methods for configuration of downlink control information (DCI) formats.

BACKGROUND

In Release 16 (Rel-16) of the New Radio (NR) specifications, new downlink control information (DCI) formats for downlink (DL) and uplink (UL) scheduling are introduced. The new DCI formats share some similarity to the non-fallback DCI formats 0_1 and 1_1 in Release 15 (Rel-15) in the sense that many fields in the DCI formats 0_1 and 1_1 also exist in the new DCI formats but with a higher degree of configurability, i.e., many of the fields are configurable in size.

The new DCI formats are expected to be used for ultra-reliable low-latency communication (URLLC) scheduling as the DCI size can be configured to be very small which can help to improve the robustness of physical downlink control channel (PDCCH) transmission.

The present disclosure refers to the new DCI format for DL scheduling as DCI format 1_2 and the new DCI format for UL scheduling as DCI format 0_2. These naming conventions are simply for example and explanation, and the naming conventions may be different when included in the specification.

SRS Request Field

The sounding reference signal (SRS) request field is one of the fields in the DCI formats 0_2 and 1_2 used to indicate the triggered aperiodic SRS resource sets corresponding to the SRS transmission. The SRS request field can also indicate the associated channel state information reference signal (CSI-RS) for the non-codebook-based UL transmission.

For DCI formats 0_1 and 1_1 in Rel-15, the SRS request field is of size 2 or 3 bits, where the field size is determined as:

2 bits as defined by Table 7.3.1.1.2-24 in Third Generation Partnership Project (3GPP) TS 38.212 for user equipments (UEs) not configured with supplementary Uplink in ServingCellConfig in the cell;

3 bits for UEs configured with supplementary Uplink in ServingCellConfig in the cell where the first bit is the non-Supplementary Uplink (Non-SUL)/Supplementary Uplink (SUL) indicator as defined in Table 7.3.1.1.1-1 and the second and third bits are defined by Table 7.3.1.1.2-24.

For DCI formats 0_2 and 1_2 in Rel-16, the SRS request field can be of size 0 bit (the field is absent), 2, or 3 bits. It is under the discussion whether the field can also be of size 1 bit.

For the DCI format 1_2, it was agreed to introduce a radio resource control (RRC) parameter, tentatively called SRS-Request-ForDCIFormat1_2 (though the term is provided for example and explanation and may change when included in the specification) to indicate whether the SRS request field is absent or present in the DCI format 1_2.

MCS Field

The modulation coding scheme (MCS) field is one of the fields in the DCI formats 0_2 and 1_2 used to indicate modulation and coding scheme for the scheduled Physical Downlink Shared Channel (PDSCH)/Physical Uplink Shared Channel (PUSCH) or activated PDSCH/PUSCH.

In Rel-15, the MCS field in all DCI formats 0_0/1_0 and 0_1/1_1 are of fixed size such as, for example, 5 bits. There are three different MCS tables which can be configured or indicated to a User Equipment (UE). These MCS tables can include up to 29 MCS entries (excluding the reserved ones) to support flexible scheduling in different channel conditions.

The indication of MCS table can be configured in RRC by a parameter mcs-Table in PDSCH-config, PUSCH-Contig, or ConfiguredGrantConfig IE, or dynamically indicated by a specific Radio Network Temporary Identifier (RNTI), e.g., MCS-Cell-RNTI (MSC-C-RNTI) which scrambles the cyclic redundancy check (CRC) of PDCCH scheduling a PDSCH or PUSCH (switching between MCS table 1 or 2 as configured in RRC and MCS table 3).

In DL transmission, a 4-bit channel quality indicator (CQI) report can be transmitted from a UE to a gNodeB (gNB), which is a base station in NR, to indicate channel quality in the DL so that gNB can take into account when performing link adaptation in the scheduling, e.g., to select a proper MCS. In Rel-15, there are three CQI tables defined, two corresponding to the target block error rate (BLER) of 10% (CQI tables 1 and 2) and one corresponding to the target BLER of $10^{-5}$ (CQI table 3). Most of the entries in the CQI table are a subset of the MCS table. Format 0_1 and Format 11 are described in more detail in 3GPP TS 38.212, V15.7.0. 3GPP TS 38.214, V15.7.0 includes tables defining the SRS Request, the MCS indexes for PDSCH, and the 4-bit QCI.

There currently exist certain challenge(s). For example, it is unclear how the SRS field size should be determined if 1 bit is additionally supported as a possible field size for the SRS request field in the DCI format 1_2 and 0_2. It is also unclear what the value ranges the RRC parameters SRSRequest-ForDCIFormat1_2 and SRSRequest-ForDCIFormat0_2 (if introduced) should support if 1 bit is additionally supported as a possible field size for the SRS request field in the DCI format 1_2 and 0_2. It is also unclear how the mapping from the indicated codepoint of SRS request field to the triggered aperiodic SRS resource sets would be if 1 bit is additionally supported as a possible field size for the SRS request field in the DCI format 1_2 and 0_2. Additionally, for MCS field in the DCI formats 0_2 and 1_2, if the MCS field size is reduced to less than 5 bits, it is unclear how the field indicated an entry in the MCS table.

SUMMARY

Certain aspects of the present disclosure and their embodiments may provide solutions to these or other challenges. According to certain embodiments, methods are disclosed for determining the number of Sounding Reference Signal (SRS) request field size when 1 bit is additionally supported as a possible field size for the SRS request field in the downlink control information (DCI) format 1_2 and 0_2.

According to certain embodiments, a method by a wireless device includes determining a value of a SRS request field size and receiving DCI, from a network node. The DCI is received according to a format. The wireless device selects a SRS resource set based on the format of the DCI and the value of the SRS request field size.

According to certain embodiments, a wireless device includes processing circuitry configured to determine a value of a SRS request field size and receive DCI, from a network node. The DCI is received according to a format. The processing circuitry is configured to select a SRS resource set based on the format of the DCI and the value of the SRS request field size.

According to certain embodiments, a method by a network node includes configuring a wireless device to select a SRS resource set based on a format of DCI and a value of a SRS request field size. The network node transmits, to the wireless device, a message indicating the value of the SRS request field size. The network node also transmits, to the wireless device, the DCI configured in the format for the selection of the SRS resource set.

According to certain embodiments, a network node includes processing circuitry configured to configured a wireless device to select a SRS resource set based on a format of DCI and a value of a SRS request field size. The processing circuitry is configured to transmit, to the wireless device, a message indicating the value of the SRS request field size. The processing circuitry is also configured to transmit, to the wireless device, the DCI configured in the format for the selection of the SRS resource set.

Certain embodiments may provide one or more of the following technical advantage(s). For example, a technical advantage may be that certain embodiments provide methods to support 1-bit SRS request field in the DCI formats 0_2 and 1_2. As another example, a technical advantage may be that certain embodiments provide methods to select a subset of Channel Quality Indicator (CQI) entries to be used as Modulation and Coding Scheme (MCS) entries for the MCS field with reduced size in the DCI formats 0_2 and 1_2.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
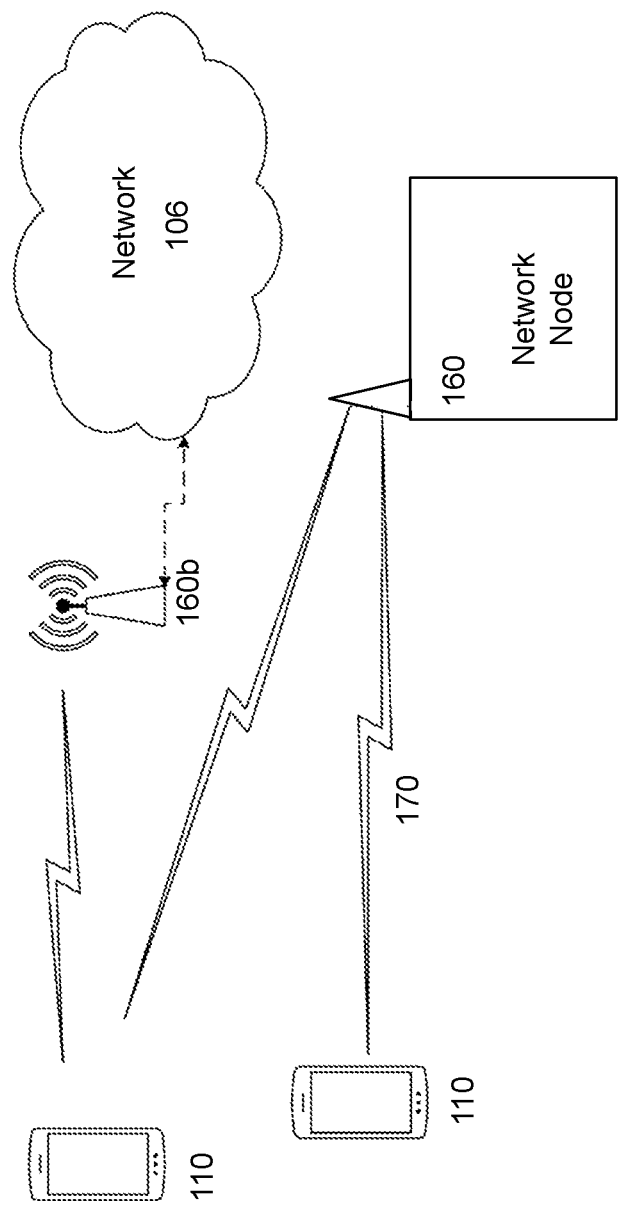
FIG. 1 illustrates an example wireless network, according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain embodiments propose suitable value ranges for the Radio Resource Control (RRC) parameters SRSRequest-ForDCIFormat1_2 and SRSRequest-ForDCIFormat0_2 (if introduced) when 1 bit is additionally supported as a possible field size for the SRS request field in the downlink control information (DCI) format 1_2 and 0_2. Certain embodiments disclose methods for mapping the indicted codepoint of Sounding Reference Signal (SRS) request field to the triggered aperiodic SRS resource sets if 1 bit is additionally supported as a possible field size for the SRS request field in the DCI format 1_2 and 0_2. Certain embodiments disclose methods to select a subset of MCS entries to be used for MCS field with reduced size in the DCI formats 0_2 and 1_2. Certain embodiments provide solutions for configuring DCI formats in New Radio (NR) Release 16 (Rel-16) and future specifications.

There are, proposed herein, various embodiments which address one or more of the issues disclosed herein.

SRS Request Field

Herein, an RRC parameter that indicates whether the SRS request field is present or absent in the DCI formats 12 is termed SRSRequest-ForDCIFormat1_2. This term is for example purposes only and may change when officially included in the specification. Similarly, an RRC parameter that indicates whether the SRS request field is present or absent in the DCI formats 0_2 is termed SRSRequest-ForDCIFormat0_2. This term is also for example purposes only and may change when officially included in the specification.

In a particular embodiment, the RRC parameter SRSRequest-ForDCIFormat1_2, when configured, takes a value from two possible values, e.g., value 1 or 2 to indicate the number of bits corresponding to a subset of options for the triggered aperiodic SRS resource sets defined in Table 7.3.1.1.2-24 in 3GPP TS 38.212.

For example, if the configured value 1 indicates 1 bit, then this one bit selects one of the first two rows for the triggered aperiodic SRS resource sets defined in Table 7.3.1.1.2-24 in TS 38.212. As an example, setting the one bit to 0 may select a first row and setting the one bit to 1 may select a second row. If the configured value 2 indicates 2 bits, then these two bits indicate one of the four rows for the triggered aperiodic SRS resource sets defined in Table 7.3.1.1.2-24 in 3GPP TS 38.212. As an example, the two bits may be set to 00 or 01 or 10 or 11, wherein each setting indicates a respective row.

In a particular embodiment, an RRC parameter SRSRequest-ForDCIFormat0_2 is used to indicate whether the SRS request field is present or absent in the DCI formats 0_2.

In a particular embodiment, the RRC parameter SRSRequest-ForDCIFormat0_2, when configured, takes a value from two possible values, e.g., value 1 or 2 to indicate the number of bits corresponding to a subset of options for the triggered aperiodic SRS resource sets defined in Table 7.3.1.1.2-24 in 3GPP TS 38.212.

When a parameter SRSRequest-ForDCIFormat1_2 or SRSRequest-ForDCIFormat0_2 is not configured, the SRS request field in the DCI formats 1_2 or 0_2 is absent.

In a particular embodiment, when the SRS request field is not present in the DCI formats 12 or 0_2, no aperiodic SRS resource set is triggered.

In a particular embodiment, the SRS request field size in the DCI formats 1_2 or 0_2 depends on the configurations of an RRC parameter SRSRequest-ForDCIFormat1_2 or SRSRequest-ForDCIFormat0_2 and the RRC parameter supplementaryUplink in ServingCellConfig IE.

In a particular embodiment, configuration of the parameter supplementaryUplink in ServingCellConfig IE indicates whether there is an extra bit to indicate non-SUL/SUL for the SRS transmission.

According to various particular embodiments, the SRS request field size in DCI format 12 can be determined as:
  if SRSRequest-ForDCIFormat1_2 is not configured
    0 bit, corresponding to no aperiodic SRS resource set triggered
  if SRSRequest-ForDCIFormat1_2 is configured and takes the first value, e.g., value 1
    1 bit if UE is not configured with supplementaryUplink in ServingCellConfig IE: the bit selects one of the first two rows of Table 7.3.1.1.2-24 in 3GPP TS 38.212, i.e., only allow one Triggered aperiodic SRS resource set
    2 bits if UE is configured with supplementaryUplink in ServingCellConfig IE: the first bit is used for the non-SUL/SUL indication and the second bit selects one of the first two rows of Table 7.3.1.1.2-24 in 3GPP TS 38.212
  if SRSRequest-ForDCIFormat1_2 is configured and takes the second values, e.g., value 2
    2 bits if UE is not configured with supplementaryUplink in ServingCellConfig IE: the two bits are used to select one of the four rows of Table 7.3.1.1.2-24 in 3GPP TS 38.212
    3 bits if UE is configured with supplementaryUplink in ServingCellConfig IE: the first bit is used for the non-SUL/SUL indication and the last two bits select one of the four rows of Table 7.3.1.1.2-24 in 3GPP TS 38.212

The SRS request field size in DCI format 0_2 can be determined as:
  if SRSRequest-ForDCIFormat0_2 is not configured
    0 bit, corresponding to no aperiodic SRS resource set triggered
  if SRSRequest-ForDCIFormat0_2 is configured and takes the first value, e.g., value 1
    1 bit if UE is not configured with supplementaryUplink in ServingCellConfig IE: the bit selects one of the first two rows of Table 7.3.1.1.2-24 in 3GPP TS 38.212
    2 bits if UE is configured with supplementaryUplink in ServingCellConfig IE: the first bit is used for the non-SUL/SUL indication and the second bit selects one of the first two rows of Table 7.3.1.1.2-24 in 3GPP TS 38.212
  if SRSRequest-ForDCIFormat0_2 is configured and takes the second values, e.g., value 2
    2 bits if UE is not configured with supplementaryUplink in ServingCellConfig IE: the two bits are used to select one of the four rows of Table 7.3.1.1.2-24 in 3GPP TS 38.212
    3 bits if UE is configured with supplementaryUplink in ServingCellConfig IE: the first bit is used for the non-SUL/SUL indication and the last two bits select one of the four rows of Table 7.3.1.1.2-24 in 3GPP TS 38.212

In one non limiting embodiment, the parameter SRSRequest-ForDCIFormat1_2 is always configured if a UE is configured with supplementaryUplink in ServingCellConfig IE.

In one non limiting embodiment, the parameter SRSRequest-ForDCIFormat1_2 can be configured or not configured regardless of whether a UE is configured with supplementaryUplink in ServingCellConfig IE or not.

MCS Field

In a particular embodiment, if the MCS field in the DCI format 0_2/1_2 is smaller than 5 bits, the MCS field corresponds to a subset of entries with modulation scheme and code rate taken from the CQI table. In other words, the MCS field indicates an entry in a reduced MCS table which is formed by entries with modulation scheme and code rate taken from the CQI table.

In a particular embodiment, the CQI table from which the entries of the reduced MCS table are taken corresponds to the configured/indicated MCS table. That is,
  If MCS index table 1 (Table 5.1.3.1-1 in 3GPP TS 38.214) is indicated/configured to a UE and the MCS field size is less than 5 bits, the entries of the reduced MCS table are taken from the CQI table 1 (Table 5.2.2.1-2 in 3GPP TS 38.214)

If MCS index table 2 (Table 5.1.3.1-2 in 3GPP TS 38.214) is indicated/configured to a UE and the MCS field size is less than 5 bits, the entries of the reduced MCS table are taken from the CQI table 2 (Table 5.2.2.1-3 in 3GPP TS 38.214)

If MCS index table 3 (Table 5.1.3.1-3 in 3GPP TS 38.214) is indicated/configured to a UE and the MCS field size is less than 5 bits, the entries of the reduced MCS table are taken from the CQI table 3 (Table 5.2.2.1-4 in 3GPP TS 38.214)

In a particular embodiment, the entries of the reduced MCS table is selected by uniformly sampling the entries in the corresponding CQI table.

In a particular embodiment, the entries of the reduced MCS table is selected by uniformly sampling the entries in the corresponding CQI table after removing some entries in the CQI table.

In a particular embodiment, some entries in the CQI table are excluded when being selected to form the reduce MCS table, e.g., the first (excluding not out of range) or last entry.

In a particular embodiment, the reduced MCS table is formed by a set of RRC configured entries taken from the corresponding CQI table.

In a particular embodiment, the reduced MCS table contains one reserved entry for each modulation order Qm, Qm=2, 4, 6, 8 if there is at least one MCS entry with that modulation order in the reduced MCS table.

In a particular embodiment, there is an RRC parameter to configure the size of the MCS field in the DCI format 0_2 or 12, where the size can be less than 5 bits. The size of the reduced MCS table is equal to the size of the reduced MCs field.

In a particular embodiment, reduced MCS tables for PUSCH contain entries from a CQI table.

In a particular embodiment, reduced MCS tables only contain entries present in the original MCS table.

In a particular embodiment, reduced MCS tables do not contain entries with different modulation order but spectral efficiencies close to each other.

In a particular embodiment, the smallest difference in spectral efficiency between adjacent entries in the reduced MCS table is strictly larger than the smallest difference in spectral efficiency in the original MCS table.

In a particular embodiment, the MCS table reduction is related to a scaling factor, where the scaling factor S modifies the transport block size (TBS) in the TBS determination procedure. The scaling factor can take example values S<=1, e.g., {1, ½, ¼, ⅛, 1/16}, or example values S>=1, e.g., {8, 4, 2, 1}. When scaling factor S other than 1 is applied, it changes the TBS, hence changes the effective MCS. For example, when S<=1 is applied, a reduced MCS table is used where the MCS values tend to be higher (or, alternatively lower). When S>=1 is applied, a reduced MCS table is used where the MCS values tend to be lower (or, alternatively higher). The scaling factor can be RRC signaled, or MAC signaled. It can also be implicitly provided via another parameter, for example, the scaling factor used for TB scaling of paging (associated with P-RNTI) and random access (associated with RA-RNTI).

In one non-limiting embodiment, the MCS table reduction is related to a repetition factor (also known as aggregation factor), which indicates the number of times a PDSCH or PUSCH transmission is repeated across time. The repetition factor K typically takes value like K={1, 2, 4, 8, 16}. For example, the reduced MCS table uses higher MCS values if K>=K_threshold; otherwise, the reduced MCS table uses lower MCS values. One example of K_threshold is K_threshold=4, while other thresholds can be used as well.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 2:
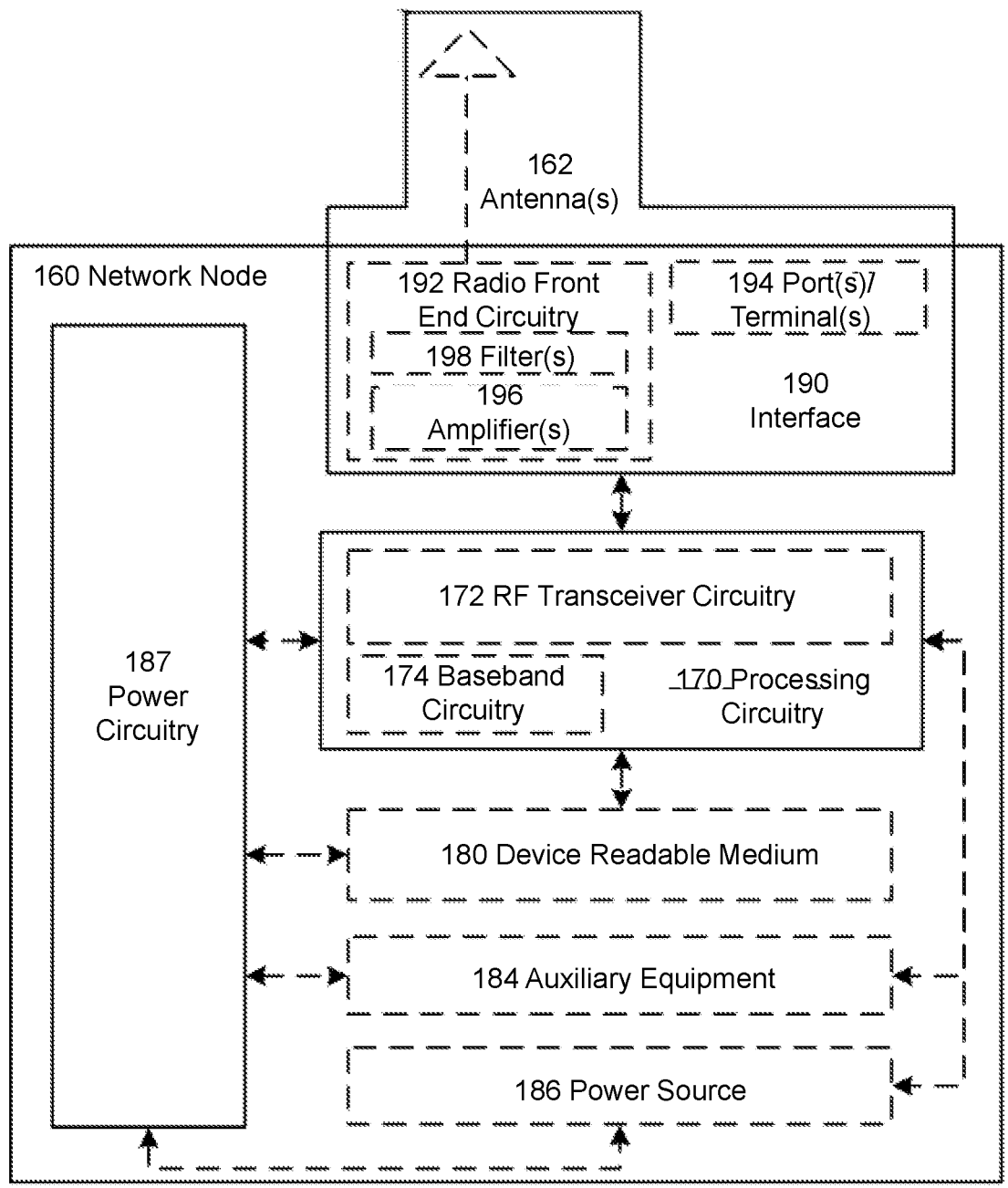
FIG. 2 illustrates an example network node, according to certain embodiments.

FIG. 2 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation and Maintenance (O&M) nodes, Operations Support System (OSS) nodes, Self-Optimizing Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile Communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 3:
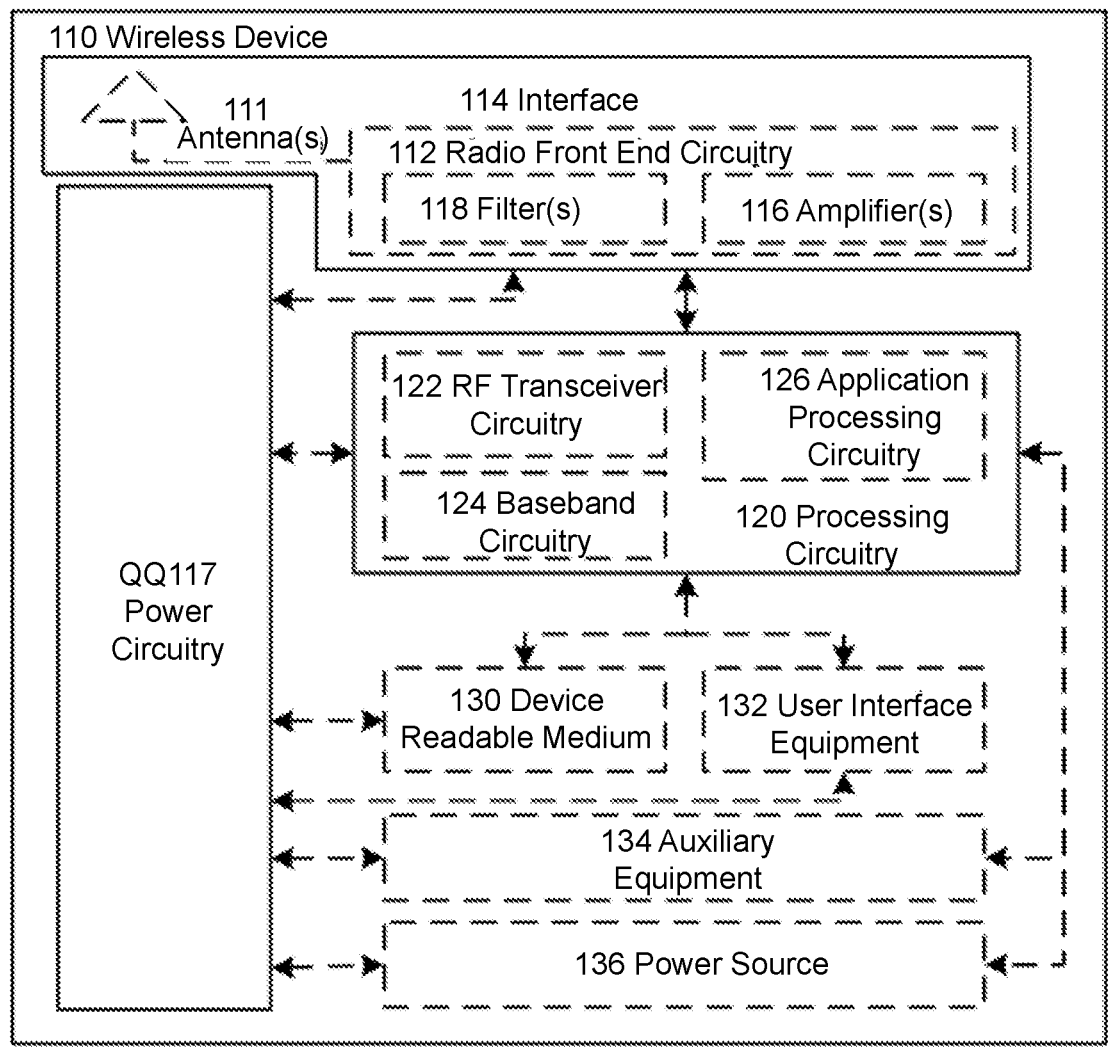
FIG. 3 illustrates an example wireless device, according to certain embodiments.

FIG. 3 illustrates an example wireless device, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 4:
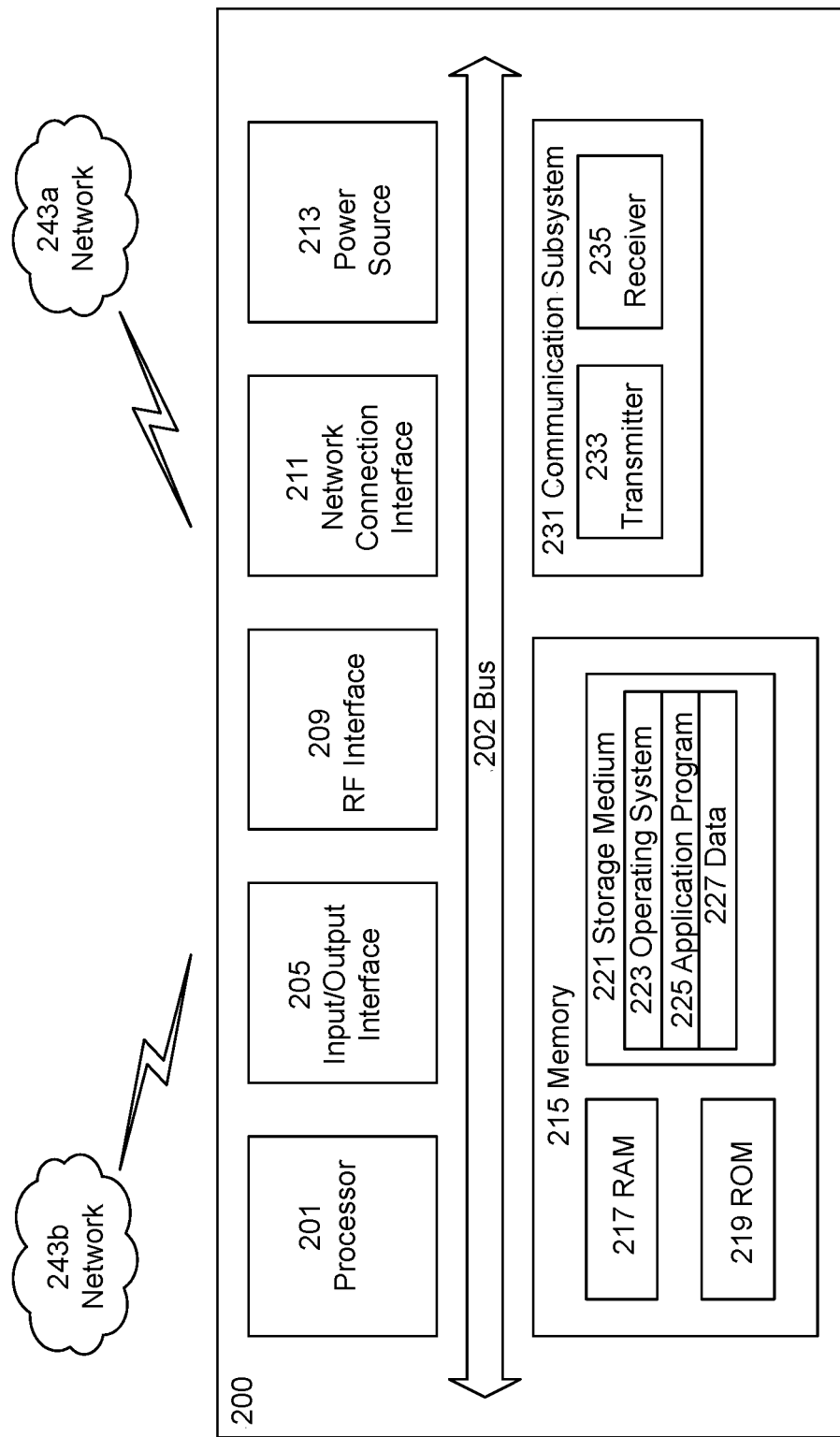
FIG. 4 illustrate an example user equipment, according to certain embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 2 is a UE, the components discussed herein are equally applicable to a wireless device, and vice-versa.

In FIG. 4, UE 200 includes processing circuitry 201 that is operatively coupled to input/output interface 205, radio frequency (RF) interface 209, network connection interface 211, memory 215 including random access memory (RAM)

217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, Code Division Multiplexing Access (CDMA), Wide CDMA (WCDMA), Global System for Mobile Communication (GSM), Long Term Evolution (LTE), Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
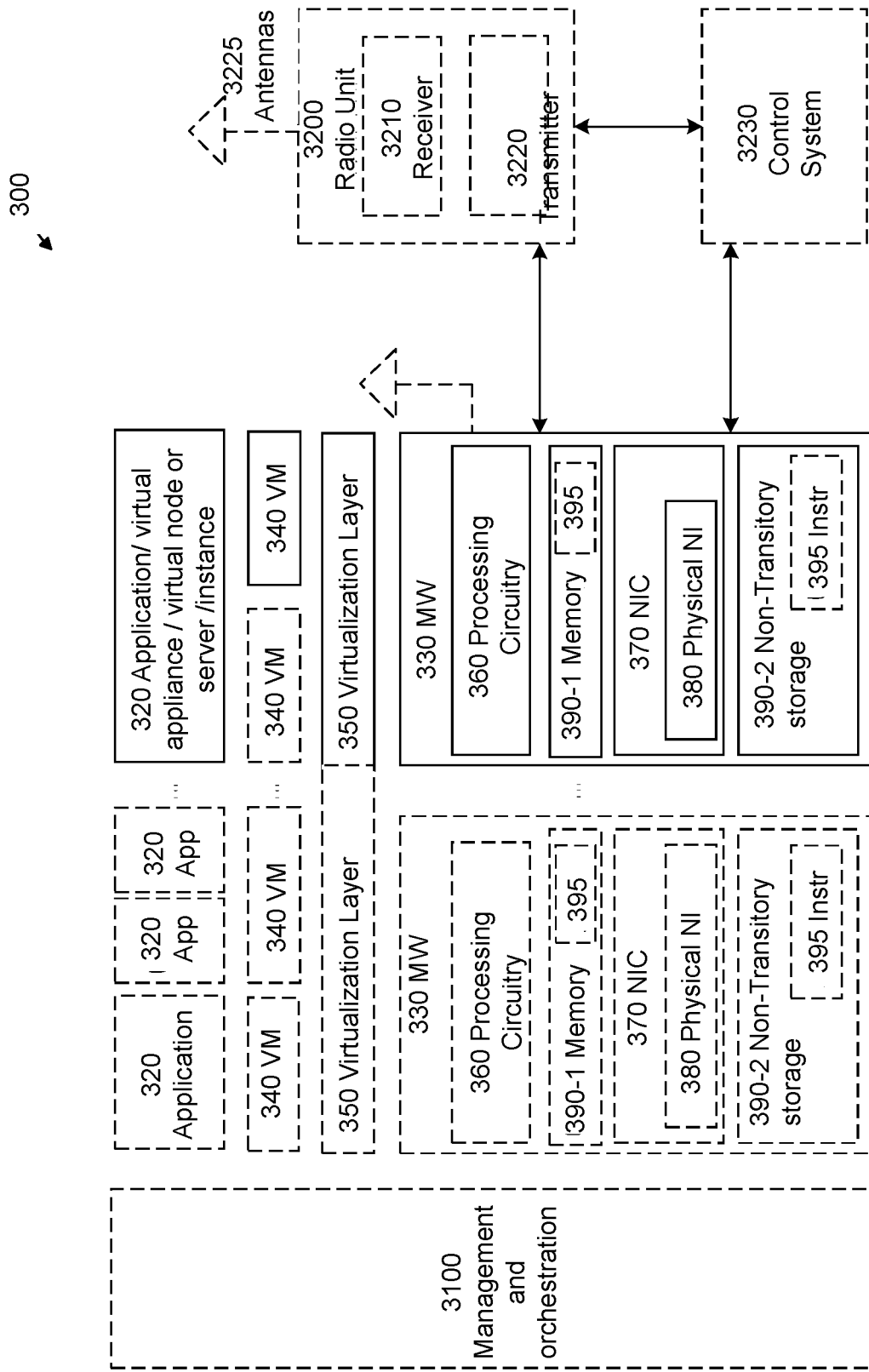
FIG. 5 illustrates a virtualization environment in which functions implemented by some embodiments may be virtualized, according to certain embodiments.

FIG. 5 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 5, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 6:
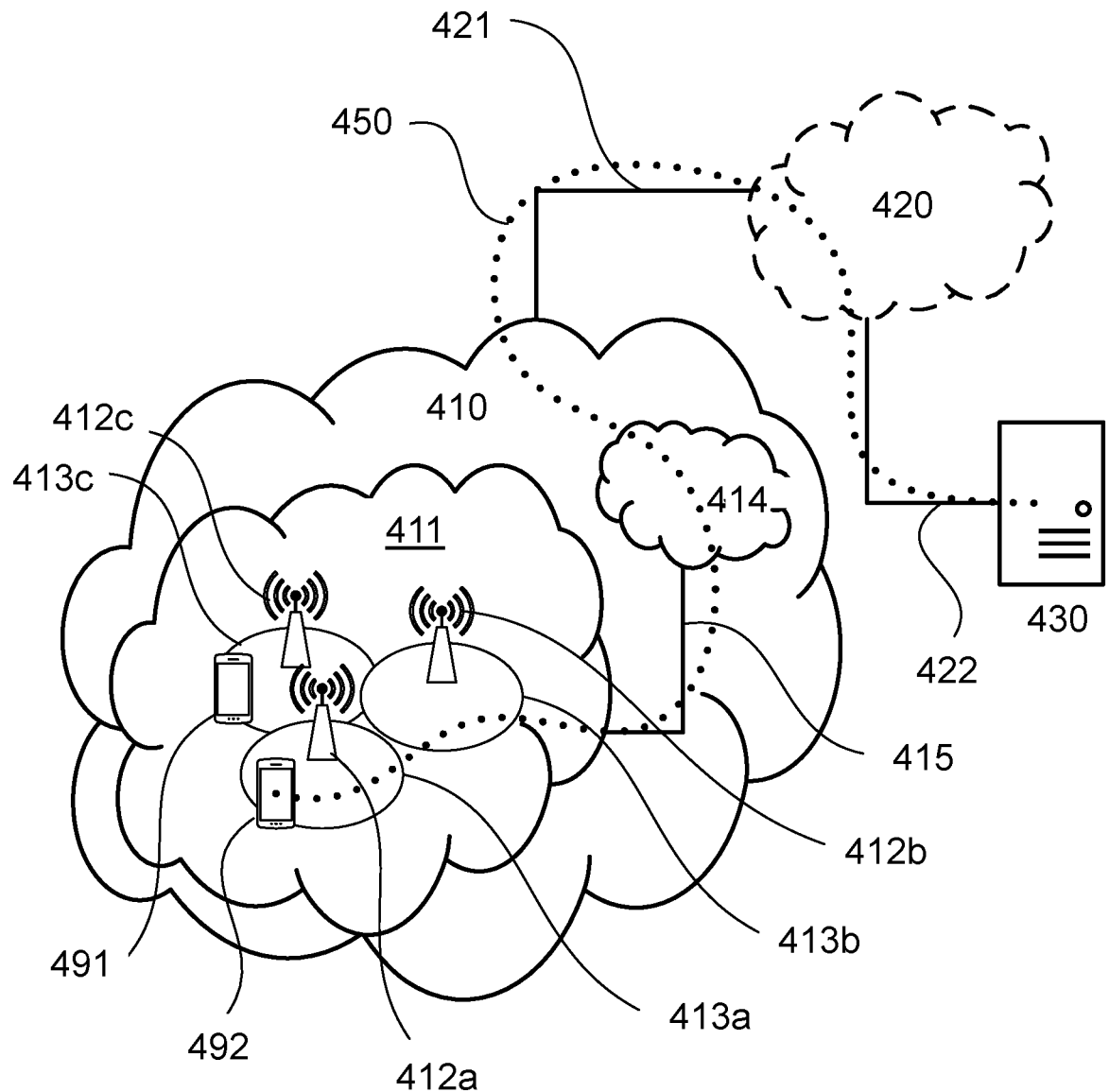
FIG. 6 illustrates a telecommunication network connected via an intermediate network to a host computer, according to certain embodiments.

With reference to FIG. 6, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 6 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 7. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 7:
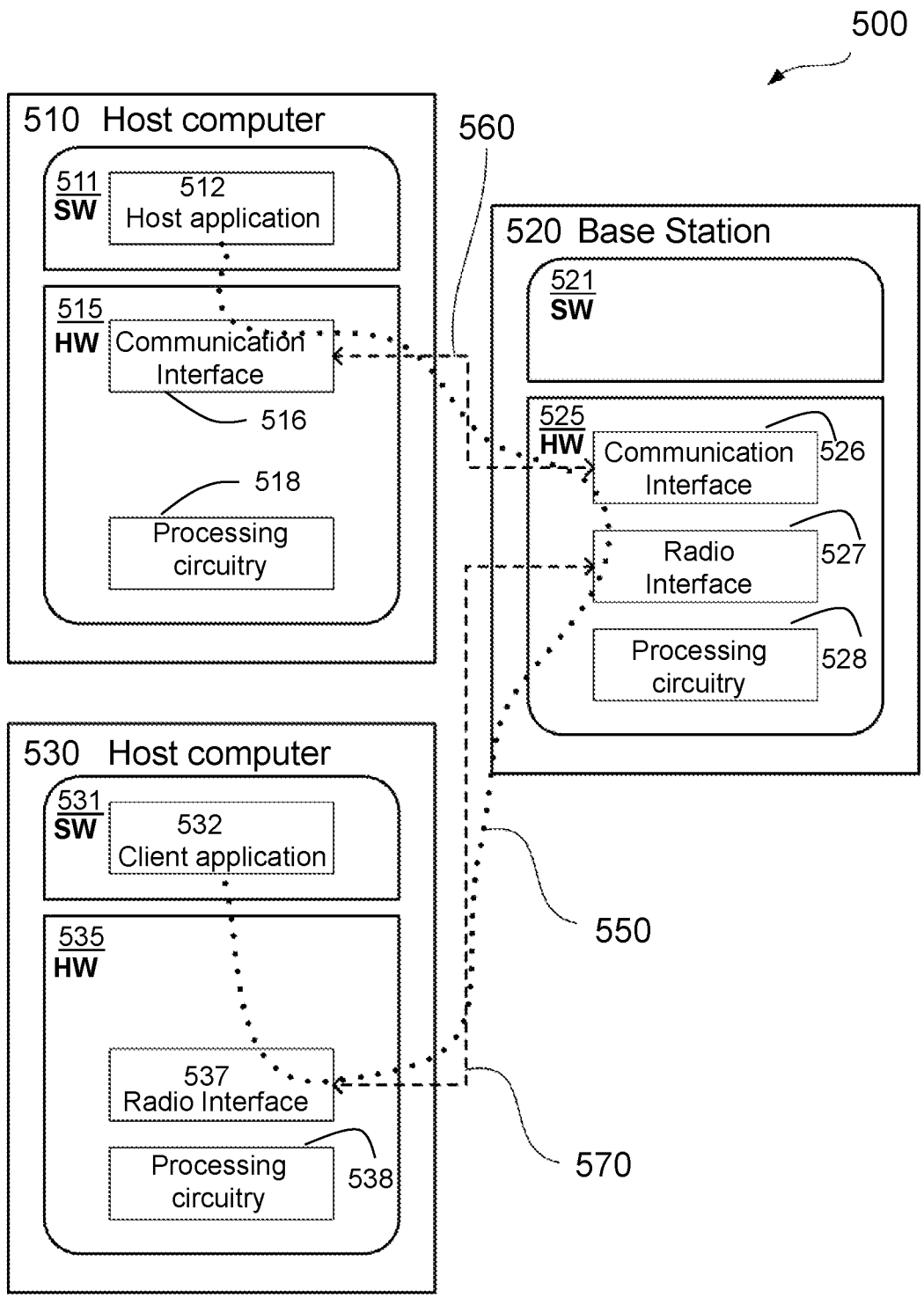
FIG. 7 illustrates a generalized block diagram of a host computer communicating via a base station with a user equipment over a partially wireless connection, according to certain embodiments.

It is noted that host computer 510, base station 520 and UE 530 illustrated in FIG. 7 may be similar or identical to host computer 430, one of base stations 412a, 412b, 412c and one of UEs 491, 492 of FIG. 4, respectively. This is to say, the inner workings of these entities may be as shown in FIG. 7 and independently, the surrounding network topology may be that of FIG. 6.

In FIG. 7, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 8, 9:
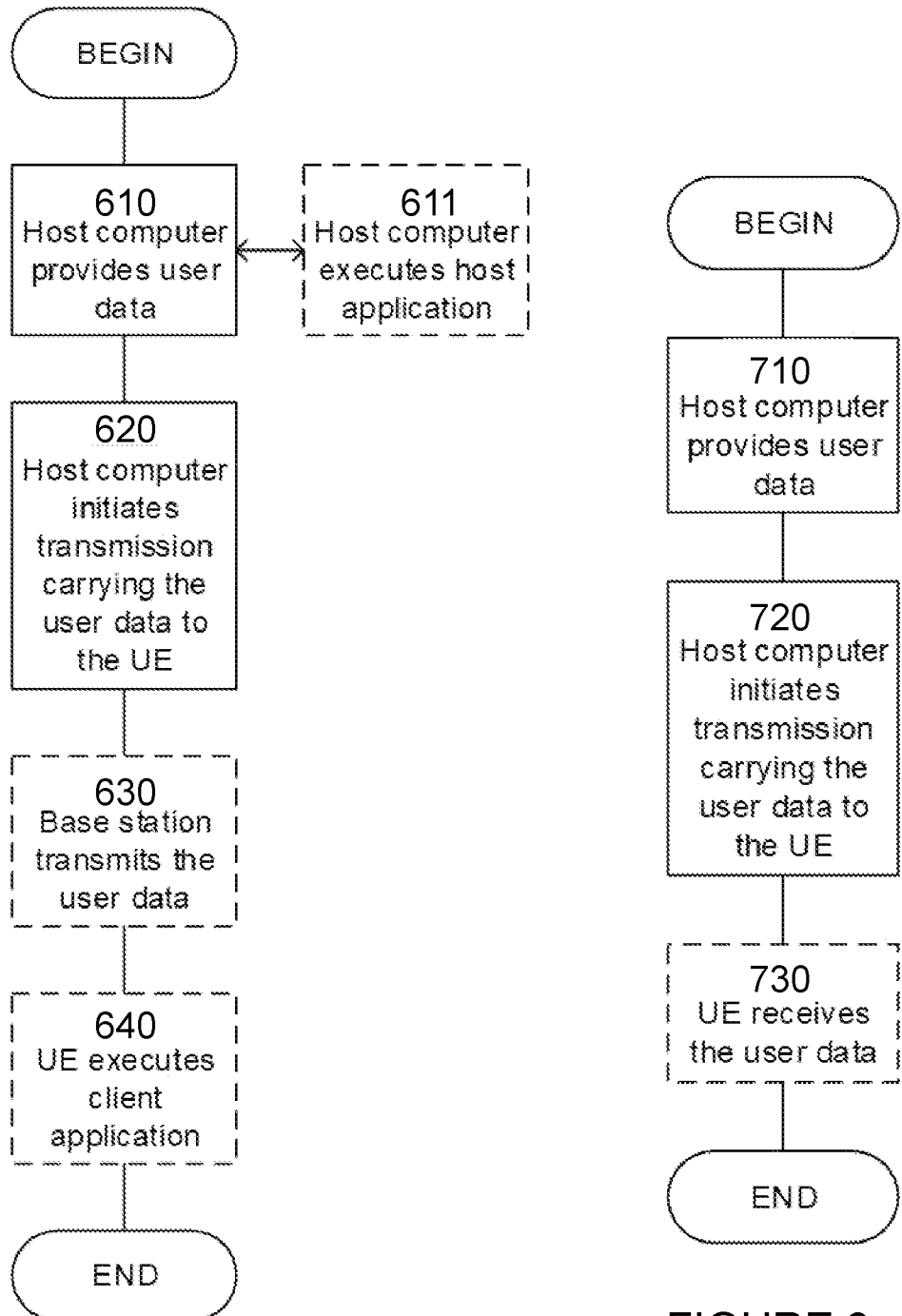
FIG. 8 illustrates a method implemented in a communication system, according to one embodiment.
FIG. 9 illustrates another method implemented in a communication system, according to one embodiment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 10, 11:
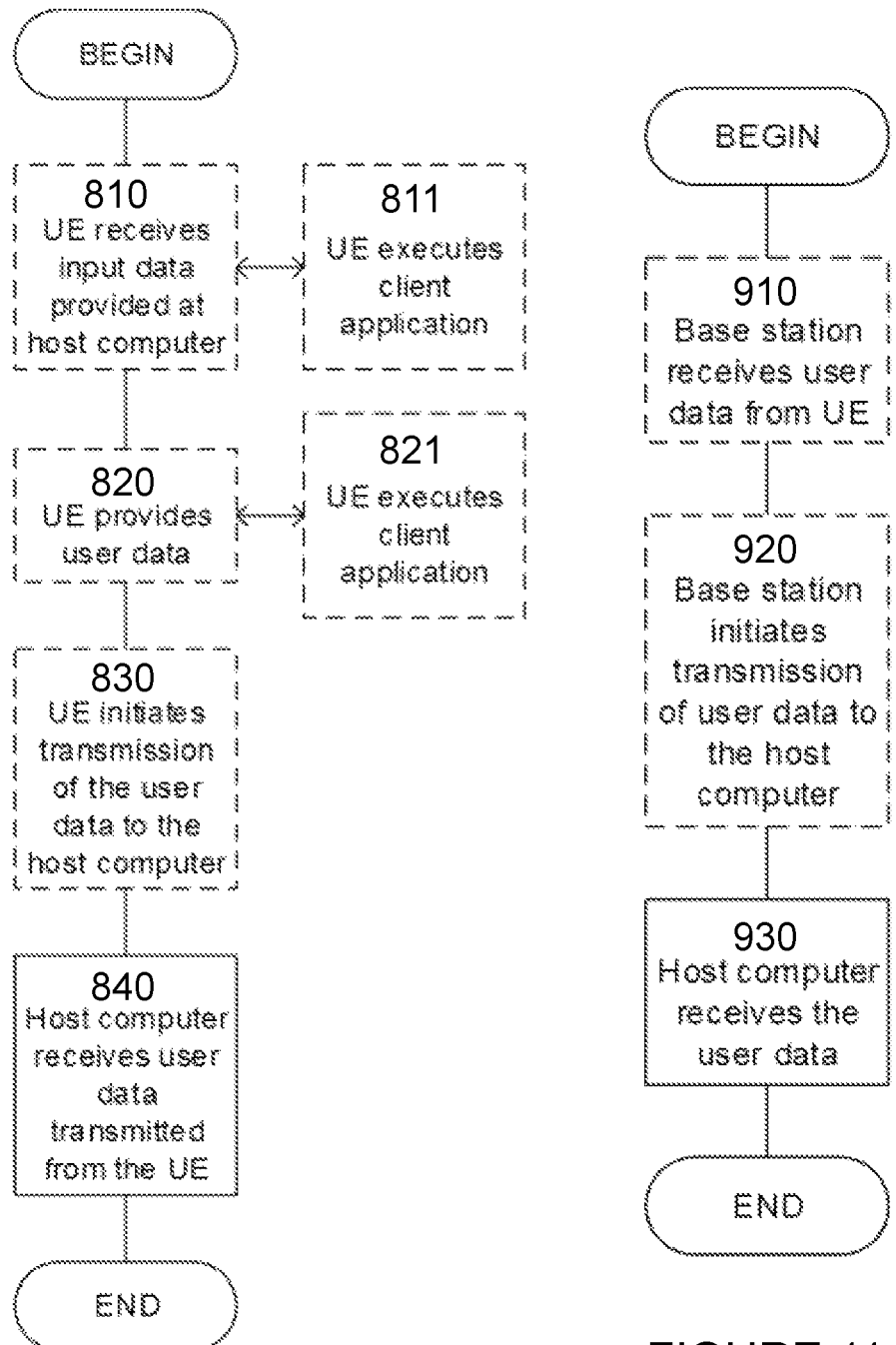
FIG. 10 illustrates another method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
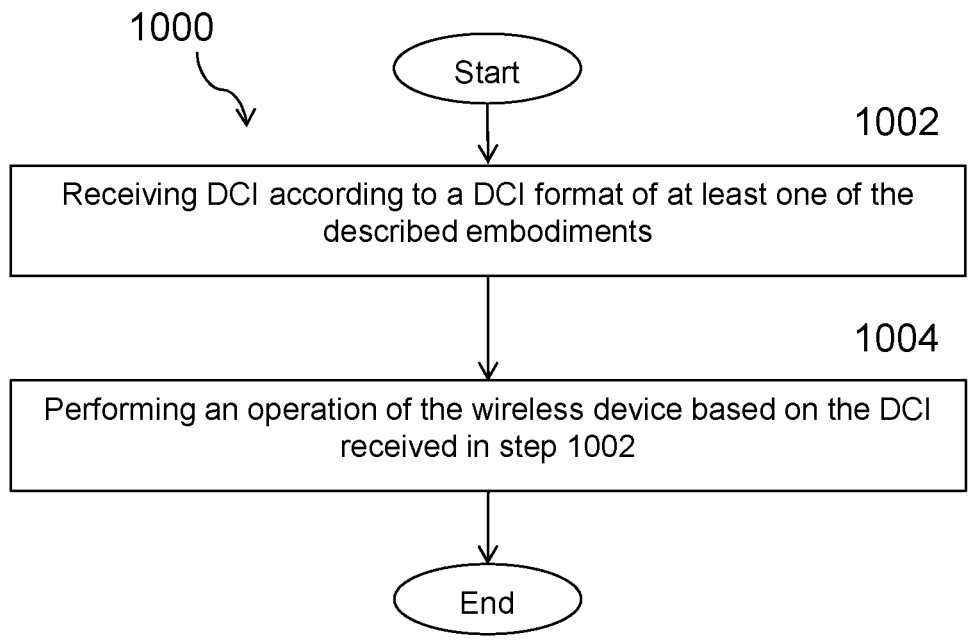
FIG. 12 illustrates an example method by a wireless device, according to certain embodiments.

FIG. 12 depicts a method 1000 in accordance with particular embodiments. The method may be performed by a wireless device, such as wireless device 110 or UE 200 described above. The method begins at step 1002 with receiving downlink control information (DCI) from a network node. The DCI is received according to a format of at least one of the described embodiments (see e.g., the embodiments under the heading "SRS Request Field" and/or the embodiments under the heading "MCS Field" in the "Additional Explanation" section above for examples of DCI formats and methods for determining the DCI formats; see also Appendix A). The method proceeds to step 1004 with performing an operation of the wireless device based on the DCI received in step 1002. For example, the method may determine information included in the DCI based on the DCI format and may use the information. Examples of information included in the DCI may include SRS information and/or MCS information.

Figure 13:
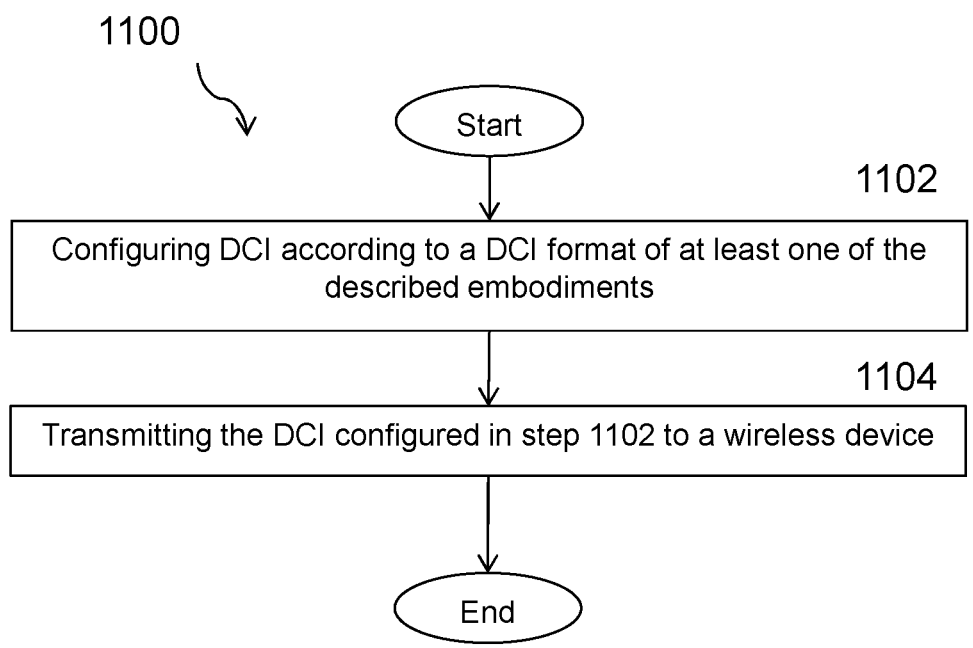
FIG. 13 illustrates an example method by a network node, according to certain embodiments.

FIG. 13 depicts a method 1100 in accordance with particular embodiments. The method may be performed by a network node, such as network node 160 described above. The method begins at step 1102 with configuring downlink control information (DCI) according to a format of at least one of the described embodiments (see e.g., the embodiments under the heading "SRS Request Field" and/or the embodiments under the heading "MCS Field" in the "Additional Explanation" section above for examples of DCI formats and methods for determining the DCI formats; see also Appendix A). The method proceeds to step 1104 with transmitting the DCI configured in step 1102 to a wireless device. As an example, the DCI may be transmitted via a PDCCH.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 14:
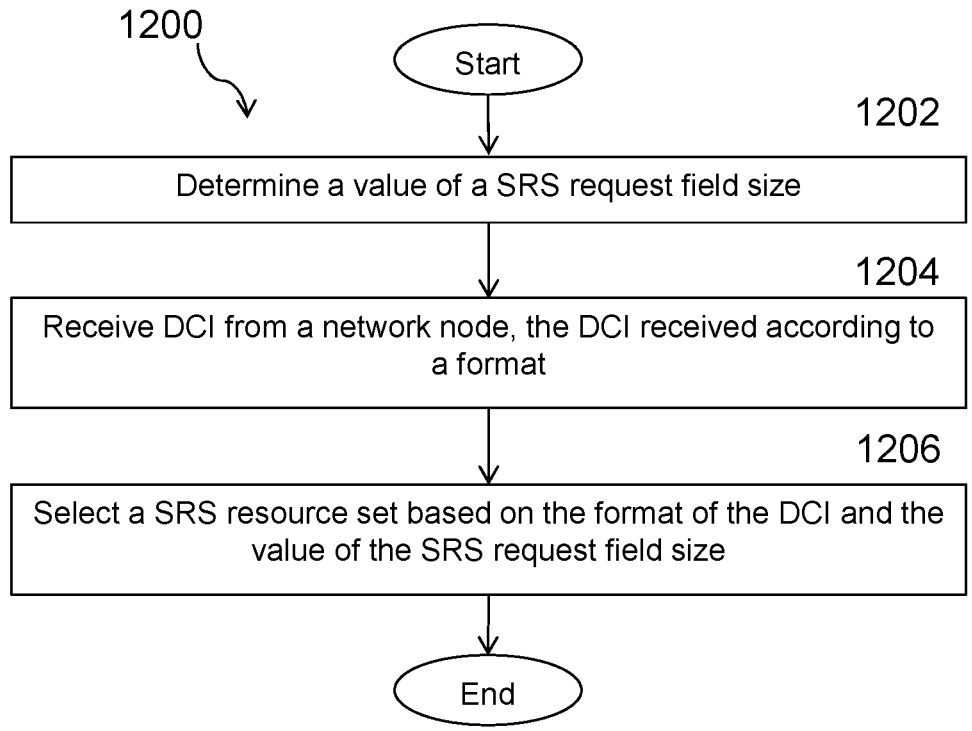
FIG. 14 illustrates another example method by a wireless device, according to certain embodiments.

FIG. 14 depicts another method 1200 by a wireless device 110, according to certain embodiments. At step 1202, the wireless device 110 determines a value of a SRS request field size. At step 1204, the wireless device 110 receives DCI from a network node. The DCI is received according to a format. At step 1206, the wireless device 110 selects a SRS resource set based on the format of the DCI and the value of the SRS request field size.

In a particular embodiment, the value of the SRS request field size is 1 or 2 or 3 bits.

In a particular embodiment, the value of the SRS request field size is 1 bit, and the SRS resource set is selected from two SRS resource sets based on the value of 1 bit.

In a particular embodiment, the value of the SRS request field size is 2 bits, and a first bit of the 2 bits indicates whether a supplementary uplink carrier is used for SRS transmission when the wireless device is configured with supplementary uplink carrier. The SRS resource set is selected from two SRS resource sets based on a second bit of the 2 bits.

In a particular embodiment, the value of the SRS request field size is 2 bits, and the SRS resource set is selected from four SRS resource sets based on the two bits.

In a particular embodiment, the value of the SRS request field size is 3 bits, and a first bit of the 3 bits indicates whether a supplementary uplink carrier is used for SRS transmission when the wireless device is configured for supplementary uplink carrier. The SRS resource set is selected from four SRS resource sets based on a second bit and a third bit of the 3 bits.

In a particular embodiment, the format of the DCI is DCI format 1_2.

In a particular embodiment, the format of the DCI is DCI format 0_2. In a further particular embodiment, the wireless device is configured for supplementary uplink.

In a particular embodiment, the resource set comprises an aperiodic resource set selected from a plurality of aperiodic resource sets based on the format of the DCI and the value of the SRS request field size.

In a particular embodiment, the wireless device 110 stores a table of SRS resource sets, and each row of the table is associated with a respective one of a plurality of values of the SRS request field size. The wireless device 110 selects the SRS resource set comprises selecting a row of the table corresponding to the value of the SRS request field size.

In a further particular embodiment, the wireless device 110 receives, from the network node 160, a message comprising the table of SRS resource sets.

Figure 15:
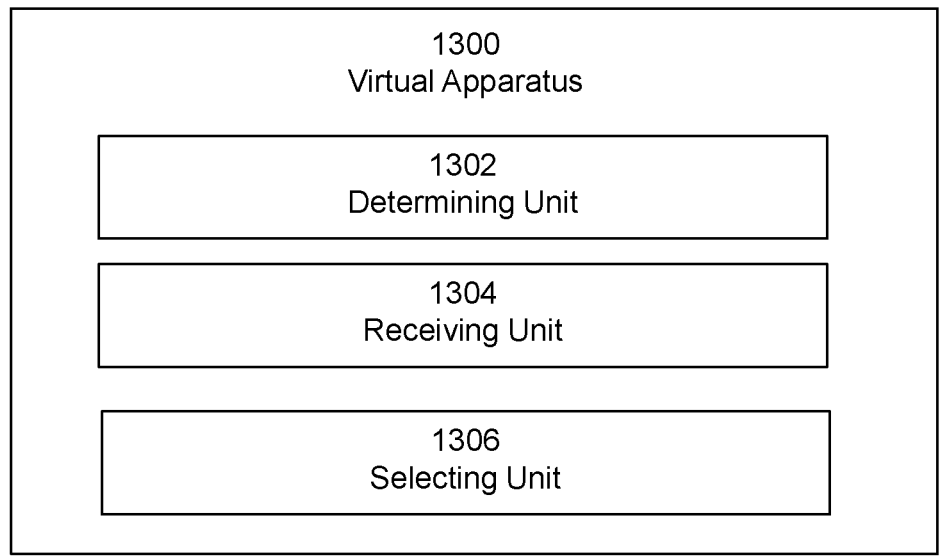
FIG. 15 illustrates a virtual apparatus in a wireless network, according to certain embodiments.

FIG. 15 illustrates a schematic block diagram of a virtual apparatus 1300 in a wireless network (for example, the wireless network shown in FIG. 1). The apparatus may be implemented in a wireless device or network node (e.g., wireless device 110 or network node 160 shown in FIG. 1). Apparatus 1300 is operable to carry out the example method described with reference to FIG. 14 and possibly any other processes or methods disclosed herein. It is also to be understood that the method of FIG. 14 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1310, receiving module 1320, selecting module 1330, and any other suitable units of apparatus 1300 to perform corresponding functions according one or more embodiments of the present disclosure. According to certain embodiments, determining module 1310 may perform certain of the determining functions of the apparatus 1300. For example, determining module 1310 may determine a value of a SRS request field size.

According to certain embodiments, receiving module 1320 may perform certain of the receiving functions of the apparatus 1300. For example, receiving module 1320 may receive DCI from a network node. The DCI is received according to a format.

According to certain embodiments, selecting module 1330 may perform certain of the selecting functions of the apparatus 1300. For example, selecting module 1330 may select a SRS resource set based on the format of the DCI and the value of the SRS request field size.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
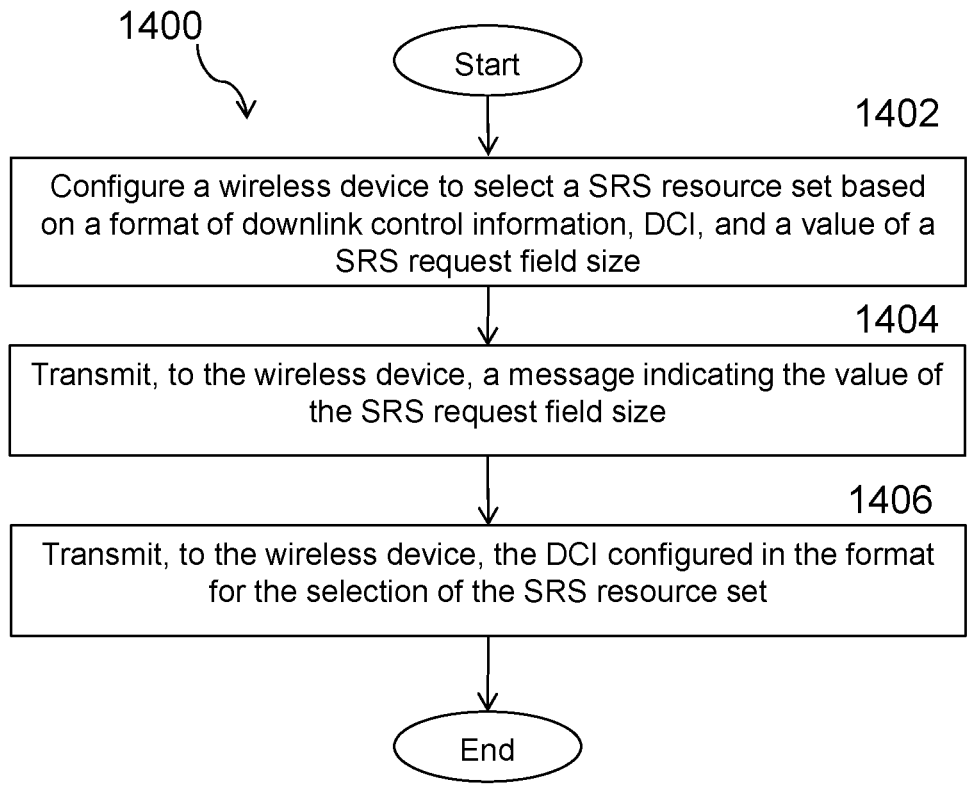
FIG. 16 illustrates another example method by a network node, according to certain embodiments.

FIG. 16 depicts a method 1400 by a network node 160, according to certain embodiments. At step 1402, the network node 160 configures a wireless device 110 to select a SRS resource set based on a format of DCI and a value of a SRS request field size. At step 1404, the network node 160 transmits, to the wireless device 110, a message indicating the value of the SRS request field size. At step 1406, the network node 160 transmits, to the wireless device 110, the DCI configured in the format for the selection of the SRS resource set.

In a particular embodiment, the value of the SRS request field size is 1 or 2 or 3 bits.

In a particular embodiment, the value of the SRS request field size is 1 bit, and configuring the wireless device 110 to select the SRS resource set includes configuring the wireless device 110 to select the SRS resource set from two SRS resource sets based on the value of 1 bit.

In a particular embodiment, the value of the SRS request field size is 2 bits, and a first bit of the 2 bits indicates whether a supplementary uplink carrier is used for SRS transmission when the wireless device is configured with supplementary uplink carrier. The network node 160 configures the wireless device 110 to select the SRS resource set from two SRS resource sets based on a second bit of the 2 bits. In a particular embodiment, the value of the SRS request field size is 2 bits, and the network node 160 configures the wireless device 110 to select the SRS resource set from four SRS resource sets based on the two bits.

In a particular embodiment, the value of the SRS request field size is 3 bits, and a first bit of the 3 bits indicates whether a supplementary uplink carrier is used for SRS transmission when the wireless device is configured for supplementary uplink carrier. The network node 160 configures the wireless device 110 to select the SRS resource set from four SRS resource sets based on a second bit and a third bit of the 3 bits.

In a particular embodiment, the format of the DCI is DCI format 1_2.

In a particular embodiment, the format of the DCI is DCI format 0_2.

In a particular embodiment, the wireless device is configured for supplementary uplink.

In a particular embodiment, the resource set comprises an aperiodic resource set selected from a plurality of aperiodic resource sets based on the format of the DCI and the value of the SRS request field size.

In a particular embodiment, the network node 160 transmits, to the wireless device 110, a table of SRS resource sets. Each row of the table is associated with a respective one of a plurality of values of the SRS request field size, and the network node 160 configures the wireless device 110 to select a row of the table corresponding to the value of the SRS request field size.

In a particular embodiment, the message comprises at least one Radio Resource Control, RRC, parameter related to at least one of a SRS request and a supplementary uplink.

Figure 17:
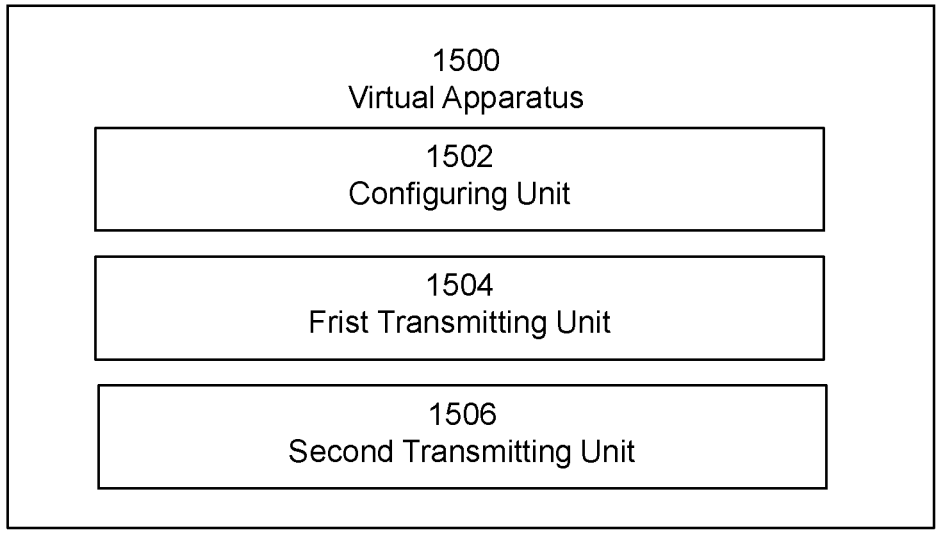
FIG. 17 illustrates another virtual apparatus in a wireless network, according to certain embodiments.

FIG. 17 illustrates a schematic block diagram of a virtual apparatus 1500 in a wireless network (for example, the wireless network shown in FIGURE A). The apparatus may be implemented in a wireless device or network node (e.g., wireless device 110 or network node 160 shown in FIG. 1). Apparatus 1500 is operable to carry out the example method described with reference to FIG. 16 and possibly any other processes or methods disclosed herein. It is also to be understood that the method of FIG. 16 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause configuring module 1510, first transmitting module 1520, second transmitting module 1530, and any other suitable units of apparatus 1500 to perform corresponding functions according one or more embodiments of the present disclosure.

According to certain embodiments, configuring module 1510 may perform certain of the configuring functions of the apparatus 1500. For example, configuring module P10 may configure a wireless device 110 to select a SRS resource set based on a format of DCI and a value of a SRS request field size.

According to certain embodiments, first transmitting module 1520 may perform certain of the transmitting functions of the apparatus 1500. For example, first transmitting module 1520 may transmits, to the wireless device 110, a message indicating the value of the SRS request field size.

According to certain embodiments, second transmitting module 1530 may perform certain of the transmitting functions of the apparatus 1500. For example, second transmitting module 1530 may transmit, to the wireless device 110, the DCI configured in the format for the selection of the SRS resource set.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Additional Information
RV, MCS and HARQ Process Signaling for URLLC

Figure 18:
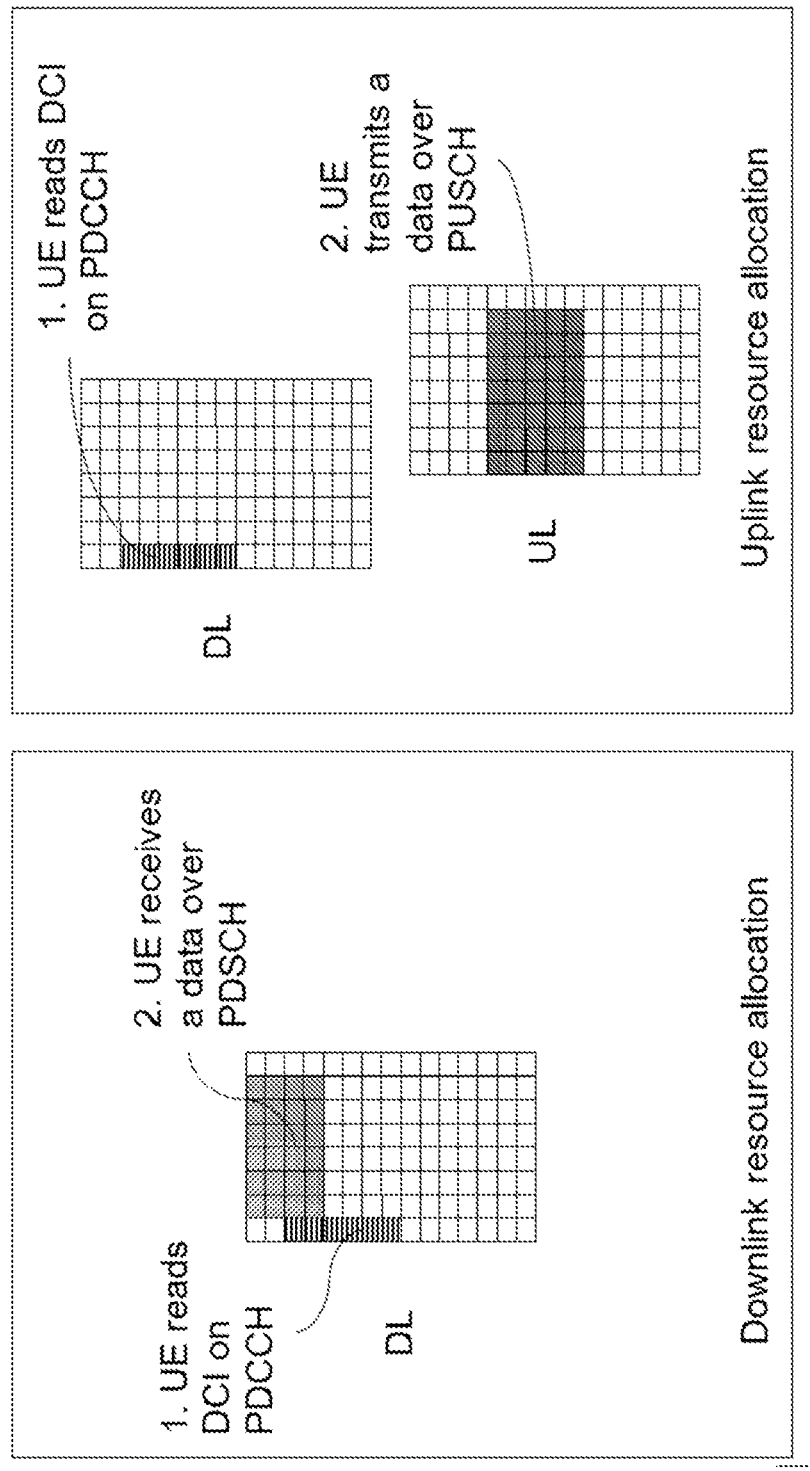
FIG. 18 illustrates an example of downlink resource allocation and uplink resource allocation, according to certain embodiments.

LTE and NR communication networks, terminals and network nodes (thereafter UE and e/gNodeB, respectively) data transmission is controlled by the nodes using grants containing among other things the details in allocated spectrum resource and the modulation and coding to transmit over that resource. The modulation and coding scheme (MCS) is signaled in the downlink control information (DCI). DCI message typically is sent over Physical Downlink Control Channel (PDCCH). An example of this process in DL and UL is shown in FIG. 18.

The modulation and coding scheme field is an index pointing to entries to the MCS table in the 3GPP specification, which once combined together with the resource allocation, will result in the transport block size (TBS) that will be transmitted. In the legacy specifications, the reason for a range of value for MCS is that the UE ability to reliably receive or transmit depends on its location in the cell. A UE near the nodeB has a low path loss and can be scheduled with a high order modulation which a UE in the cell edge faces both high path loss and intercell interference, so that the transmission must be coded with a stronger code rate and transmitted with a lower order modulation.

In LTE and NR, a framework for ultra-reliable, low latency communication is being standardized. In such framework, UEs are expected to transmit at very low error rate (order of 0.001 percent) within very tight latency bounds, down to 1 ms. The payload is expected to be very small, in the order of 100s of bits (one use case is 32 bytes).

In this use case, it is attractive to design a set of MCS indices that target a low error rate (and therefore a very low code rate) as well as provide compact signaling (and therefore a small MCS table). Low code rates are needed for the scheduled PDSCH transmission to be reliable and smaller MCS tables will allow the control channel (PDCCH or sPDCCH) to be more reliable even in a single transmission.

At the same time, HARQ process handling for low latency systems, such as short Transmission Time Interval (TTI), contains up to 16 HARQ processes and take up to 4 bits in the DCI control signaling. In systems where reliability is key, such as URLLC, it is desirable to have the most compact DCI possible to allow for a very low code rate and therefore fields are investigated for bit count reduction.

It is proposed to design reduced MCS and TBS tables based on the existing MCS/TBS tables in current 3GPP specifications. The MCS/TBS tables can be designed with a focus for a certain use case in mind, and the network can decide how and when to apply that design. The MCS field in DCI can be reduced to a smaller (e.g. 4 or 3 bits) number of bits which can be interpreted by the UE based on configuration or dynamic observations. HARQ field in DCI can be reduced as well, because retransmission timeline is much shorter for URLLC and there is only small chance for HARQ processes overlapping.

The transmission of the MCS and HARQ field is more compact and therefore more efficient channel coding can be applied, improving the reliability of the control channel. The new MCS values are focused toward lower code rates, improving the reliability of the downlink shared channel.

Certain embodiments of the present disclosure assume that new DCI size is introduced to 3GPP standard for URLLC support. The new type DCI message of small size (very compact) makes it possible to achieve lower channel coding rates, hence, increases reliability of DCI transmission.

Embodiment: MCS Field Shortening

In LTE and NR, the MCS filed in DCI comprises of 5 bits, hence in principle 32 combinations of modulation and coding rate can be signaled to UE. Every MCS has spectrum efficiency limit and certain level of robustness in such a way, that MCS with highest index is most efficient and at the same time less robust. On the contrary, MCS with lowest index is least efficient, but most robust. A base station always tries to allocate most optimal MCS according to radio channel condition. Based on above description, few embodiments can be proposed:

In one embodiment, the full version of MCS table specified in 3GPP TS 36.213 or a full version of new table to be specified in 3gpp can be punctured or down sampled
  taking even or odd entries from full MCS table, it gives 4-bits MCS field;
  MCS table can align with CQI table, which has 16 entries, hence, it gives 4-bits MCS field;
In another embodiment the MCS table can be partitioned in subsets, with each subset applicable to a certain available SNR range. For example, a partition in two subsets can be done based on good/bad snr conditions. The subsets are known to the UE and fixed.
In another embodiment the MCS table can be partitioned in subsets, with each subset corresponding to different target reliability at the UE. For example, a partition in two subsets can be done based on configured target BLER.
In another embodiment, the MCS subset to be used by the eNB and UE is fixed, either for the whole transmission period or preconfigured in a semi static way via RRC configuration.
In one embodiment, multiple MCS subsets are preconfigured in a semi static way via RRC configuration.
  Which subset to use is RRC configured or implicitly defined by other parameter such as the configured target BLER.
In another embodiment, the subset to be used by the UE is conditioned with the measured channel quality. Depending on the number of configured subsets, event 1A/1B reporting (for up to two subsets) or CQI threshold can be used to decide which subset is used.
In another embodiment, the subset to be used for decoding is either implicitly or explicitly encoded in the DCI. Implicit methods include association of the MCS field with certain bandwidth allocation (high bandwidth means for example low MCS) or other implicit mechanism. Explicit methods include signaling of the subset using dedicated bits in DCI.

The MCS and the CQI reports are tightly connected and therefore a change in the MCS subset table must be reflected in CQI reports.

In one embodiment, the CQI reports can be configured to follow the MCS used in the subframe/subslot/slot where the measurement took place. The UE then proceeds to use the corresponding subset of CQI values from the existing CQI table from 3gpp specification 3GPP TS 36.213 or any new table to be specified.

In another embodiment, the CQI reports is based on the existing CQI table, i.e., 4-bit long. Base on the received CQI report, the eNB chooses an MCS appropriately from the known MCS subset.

Embodiment: RV Field Shortening

Since redundancy version should be signaled along with MCS to enable incremental redundancy (IR), few embodiments can be applied to RV field:

In one embodiment, only one redundancy version is used in all transmissions/retransmissions, because in poor radio conditions with rates below 1/3 (for LTE, Turbo Coding) or 1/5 (for NR, LDPC BG2) IR doesn't bring any gain compared to Chase combining. Thus, RV field can be omitted;

In another embodiment, an order of RV transmissions can be defined in the standard, e.g. (0, 3, 0, 3, 0, 3 etc.). Therefore, UE can implicitly assume RV index according to transmission attempt number.

In another embodiment, two RVs can be used, making length of RV filed 1 bit.

The RVs with maximum self-decodability, e.g, RV 0 and 3 are used. This has benefit in facilitating high reliable HARQ-free transmission or automatic retransmission, especially in scenarios where the first transmission can be missed.

Embodiment: HARQ Process Number Field Shortening

In contrast with streaming traffic, critical services, like URLLC, have sporadic traffic model, when data arrives periodically of semi-periodically with relatively long pauses in between, e.g. once per second. Moreover, HARQ timeline for latency critical service tends to be as short as possible, which almost eliminates overlapping of two HARQ processes in time. Therefore, the field indicating HARQ process can be shortened or even omitted. The following options have been proposed:

In one embodiment, HARQ process field can be 1 or 2 bits, allowing 2 or 4 simultaneous processes.

Another embodiment, HARQ process field is omitted from DCI message, allowing only one HARQ process signaling.

Despite of shortening or omitting the field, some rules are proposed below to have a mapping between normal HARQ processes numeration.

In case of omitting or shortening of the HARQ field, UE and base station can assume that compact DCI always signals the process number 0 (or any other allowed number) or maintain a mapping table between signaled and legacy HARQ numbers.

In case of omitting the HARQ field, UE and base station can assume that compact DCI always signals the special process dedicated for critical data transmission such as URLLC.

EXAMPLE EMBODIMENTS

Example Embodiment 1. A method performed by a wireless device, the method comprising: receiving downlink control information (DCI) from a network node, the DCI received according to a format of at least one of the described embodiments; and performing an operation of the wireless device based on the DCI.

Example Embodiment 2. The method of any of the previous embodiments, further comprising: providing user data; and forwarding the user data to a host computer via the transmission to the base station.

Example Embodiment 3. A method performed by a base station, the method comprising: configuring downlink control information (DCI) according to a format of at least one of the described embodiments; and transmitting the DCI to a wireless device.

Example Embodiment 4. The method of any of the previous embodiments, further comprising: obtaining user data; and forwarding the user data to a host computer or a wireless device.

Example Embodiment 5. A wireless device, the wireless device comprising: processing circuitry configured to perform any of the steps of any of Example Embodiments 1 and 2; and power supply circuitry configured to supply power to the wireless device.

Example Embodiment 6. A base station, the base station comprising: processing circuitry configured to perform any of the steps of any of Example Embodiments 3 and 4; power supply circuitry configured to supply power to the base station.

Example Embodiment 7. A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 and 2; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 8. A computer program, the computer program comprising instructions which when executed on a computer perform any of the steps of any of Example Embodiments 1 and 2.

Example Embodiment 9. A computer program product comprising a computer program, the computer program comprising instructions which when executed on a computer perform any of the steps of any of Example Embodiments 1 and 2.

Example Embodiment 10. A non-transitory computer-readable storage medium or carrier comprising a computer program, the computer program comprising instructions which when executed on a computer perform any of the steps of any of Example Embodiments 1 and 2.

Example Embodiment 11. A computer program, the computer program comprising instructions which when executed on a computer perform any of the steps of any of Example Embodiments 3 and 4.

Example Embodiment 12. A computer program product comprising a computer program, the computer program comprising instructions which when executed on a computer perform any of the steps of any of Example Embodiments 3 and 4.

Example Embodiment 13. A non-transitory computer-readable storage medium or carrier comprising a computer program, the computer program comprising instructions which when executed on a computer perform any of the steps of any of Example Embodiments 3 and 4.

Example Embodiment 14. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of Example Embodiments 3 and 4.

Example Embodiment 15. The communication system of the pervious embodiment further including the base station.

Example Embodiment 16. The communication system of the previous 2 embodiments, further including the UE, wherein the UE is configured to communicate with the base station.

Example Embodiment 17. The communication system of the previous 3 embodiments, wherein: the processing circuitry of the host computer is configured to execute a host application, thereby providing the user data; and the UE comprises processing circuitry configured to execute a client application associated with the host application.

Example Embodiment 18. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of Example Embodiments 3 and 4.

Example Embodiment 19. The method of the previous embodiment, further comprising, at the base station, transmitting the user data.

Example Embodiment 20. The method of the previous 2 embodiments, wherein the user data is provided at the host computer by executing a host application, the method further comprising, at the UE, executing a client application associated with the host application.

Example Embodiment 21. A user equipment (UE) configured to communicate with a base station, the UE comprising a radio interface and processing circuitry configured to performs the of the previous 3 embodiments.

Example Embodiment 22. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of Example Embodiments 1 and 2.

Example Embodiment 23. The communication system of the previous embodiment, wherein the cellular network further includes a base station configured to communicate with the UE.

Example Embodiment 24. The communication system of the previous 2 embodiments, wherein: the processing circuitry of the host computer is configured to execute a host application, thereby providing the user data; and the UE's processing circuitry is configured to execute a client application associated with the host application.

Example Embodiment 25. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of Example Embodiments 1 and 2.

Example Embodiment 26. The method of the previous embodiment, further comprising at the UE, receiving the user data from the base station.

Example Embodiment 27. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of Example Embodiments 1 and 2.

Example Embodiment 28. The communication system of the previous embodiment, further including the UE.

Example Embodiment 29. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 30. The communication system of the previous 3 embodiments, wherein: the processing circuitry of the host computer is configured to execute a host application; and the UE's processing circuitry is configured to execute a client application associated with the host application, thereby providing the user data.

Example Embodiment 31. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 32. A method implemented in a communication system including a host computer, a base station and a user equipment (UE), the method comprising: at the host computer, receiving user data transmitted to the base station from the UE, wherein the UE performs any of the steps of any of Example Embodiments 1 and 2.

Example Embodiment 33. The method of the previous embodiment, further comprising, at the UE, providing the user data to the base station.

Example Embodiment 34. The method of the previous 2 embodiments, further comprising: at the UE, executing a client application, thereby providing the user data to be transmitted; and at the host computer, executing a host application associated with the client application.

Example Embodiment 35. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 36. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of Example Embodiments 3 and 4.

Example Embodiment 37. The communication system of the previous embodiment further including the base station.

Example Embodiment 38. The communication system of the previous 2 embodiments, further including the UE, wherein the UE is configured to communicate with the base station.

Example Embodiment 39. The communication system of the previous 3 embodiments, wherein: the processing circuitry of the host computer is configured to execute a host application; the UE is configured to execute a client application associated with the host application, thereby providing the user data to be received by the host computer.

Example Embodiment 40. A method implemented in a communication system including a host computer, a base station and a user equipment (UE), the method comprising: at the host computer, receiving, from the base station, user data originating from a transmission which the base station has received from the UE, wherein the UE performs any of the steps of any of Example Embodiments 1 and 2.

Example Embodiment 41. The method of the previous embodiment, further comprising at the base station, receiving the user data from the UE.

Example Embodiment 42. The method of the previous 2 embodiments, further comprising at the base station, initiating a transmission of the received user data to the host computer.

The invention claimed is:

1. A method by a wireless device, the method comprising:
   determining a value of a Sounding Reference Signal, SRS, request field size;
   receiving downlink control information, DCI, from a network node, the DCI received according to a format; and
   selecting a SRS resource set based on the format of the DCI and the value of the SRS request field size, wherein:
   the value of the SRS request field size is 1 bit, and
   the format of the DCI is DCI format 1_2 or DCI format 0_2.

2. The method of claim 1, wherein:
   the SRS resource set is selected from two SRS resource sets based on the value of 1 bit.

3. The method of claim 1, wherein the format of the DCI is DCI format 1_2.

4. The method of claim 1, wherein the format of the DCI is DCI format 0_2.

5. The method of claim 3, wherein the wireless device is configured for supplementary uplink.

6. The method of claim 1, wherein the resource set comprises an aperiodic resource set selected from a plurality of aperiodic resource sets based on the format of the DCI and the value of the SRS request field size.

7. The method of claim 1, further comprising storing a table of SRS resource sets, and wherein:
   each row of the table is associated with a respective one of a plurality of values of the SRS request field size, and selecting the SRS resource set comprises selecting a row of the table corresponding to the value of the SRS request field size.

8. The method of claim 7, further comprising receiving, from the network node, a message comprising the table of SRS resource sets.

9. A method by a network node, the method comprising:
   configuring a wireless device to select a Sounding Reference Signal, SRS, resource set based on a format of downlink control information, DCI, and a value of a SRS request field size;
   transmitting, to the wireless device, a message indicating the value of the SRS request field size, wherein the value of the SRS request field size is 1 bit; and
   transmitting, to the wireless device, the DCI configured in the format for the selection of the SRS resource set, wherein the format of the DCI is DCI format 1_2 or DCI format 0_2.

10. The method of claim 9, wherein the value of SRS request field size is 1 or 2 or 3 bits.

11. The method of claim 9, wherein:
    configuring the wireless device to select the SRS resource set comprises configuring the wireless device to select the SRS resource set from two SRS resource sets based on the value of 1 bit.

12. The method of claim 9, wherein the format of the DCI is DCI format 1_2.

13. The method of claim 9, wherein the format of the DCI is DCI format 0_2.

14. The method of claim 12, wherein the wireless device is configured for supplementary uplink.

15. The method of claim 9, wherein the resource set comprises an aperiodic resource set selected from a plurality of aperiodic resource sets based on the format of the DCI and the value of the SRS request field size.

16. The method of claim 9, further comprising transmitting, to the wireless device, a table of SRS resource sets, and wherein:
    each row of the table is associated with a respective one of a plurality of values of the SRS request field size, and
    configuring the wireless device to select the SRS resource set comprises configuring the wireless device to select a row of the table corresponding to the value of the SRS request field size.

17. The method of claim 9, wherein the message comprises at least one Radio Resource Control, RRC, parameter related to at least one of a SRS request and a supplementary uplink.

18. A wireless device comprising:
    processing circuitry configured to:
    determine a value of a Sounding Reference Signal, SRS, request field size;
    receive downlink control information, DCI, from a network node, the DCI received according to a format; and
    select a SRS resource set based on the format of the DCI and the value of the SRS request field size, wherein:
    the value of the SRS request field size is 1 bit, and
    the format of the DCI is DCI format 1_2 or DCI format 0_2.

19. A network node comprising:
    processing circuitry configured to:
    configure a wireless device to select a SRS resource set based on a format of downlink control information, DCI, and a value of a Sounding Reference Signal, SRS, request field size;

transmit, to the wireless device, a message indicating the value of the SRS request field size, wherein the value of the SRS request field size is 1 bit; and transmit, to the wireless device, the DCI configured in the format for the selection of the SRS resource set, wherein the format of the DCI is DCI format 1_2 or DCI format 0_2.

* * * * *